(12) United States Patent
Rockwood et al.

(10) Patent No.: US 7,552,321 B2
(45) Date of Patent: Jun. 23, 2009

(54) METHOD AND HYBRID SYSTEM FOR AUTHENTICATING COMMUNICATIONS

(75) Inventors: Troy Rockwood, Thousand Oaks, CA (US); Bong Kyu Ryu, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 775 days.

(21) Appl. No.: 10/707,100

(22) Filed: Nov. 20, 2003

(65) Prior Publication Data

US 2005/0114650 A1    May 26, 2005

(51) Int. Cl.
*H04L 9/00* (2006.01)
*G06F 15/177* (2006.01)
*G06F 15/173* (2006.01)

(52) U.S. Cl. ............... 713/155; 713/156; 713/157; 713/158; 709/220; 709/223; 709/227

(58) Field of Classification Search ............... 726/2; 380/258; 713/161, 168–169, 176, 155, 156, 713/157, 158; 398/46; 709/220, 223, 227
See application file for complete search history.

(56) References Cited

U.S. PATENT DOCUMENTS

| | | | |
|---|---|---|---|
| 6,130,875 A * | 10/2000 | Doshi et al. | 370/225 |
| 6,233,685 B1 * | 5/2001 | Smith et al. | 713/194 |
| 6,701,438 B1 * | 3/2004 | Prabandham et al. | 726/11 |
| 7,042,988 B2 * | 5/2006 | Juitt et al. | 379/88.17 |
| 2003/0105812 A1 * | 6/2003 | Flowers et al. | 709/203 |
| 2003/0130947 A1 * | 7/2003 | Benantar | 705/44 |
| 2004/0039905 A1 * | 2/2004 | Leoutsarakos | 713/153 |
| 2004/0254984 A1 * | 12/2004 | Dinker | 709/205 |

* cited by examiner

*Primary Examiner*—Ayaz R Sheikh
*Assistant Examiner*—Trang Doan
(74) *Attorney, Agent, or Firm*—Ostrager Chong Flaherty & Broitman P.C.

(57) ABSTRACT

One embodiment of the present invention is a hybrid authentication system (10) for securing communication. In this embodiment, the system (10) includes a distributed authentication infrastructure (12) with a series of nodes (16) in communication with each other. These nodes (16) are intended to perform a series of functions, one of these functions being the authentication of other nodes. The system further includes a centralized authentication infrastructure (14), which is later integrated into the distributed authentication infrastructure (12) after the distributed authentication infrastructure (12) has been established. The centralized authentication infrastructure (14) includes a central server (22) coupled to the nodes (16) for verifying the identification of the nodes (16) and/or granting permission to those nodes (16).

30 Claims, 9 Drawing Sheets

METHOD AND HYBRID SYSTEM FOR AUTHENTICATING COMMUNICATIONS

BACKGROUND OF INVENTION

The present invention relates generally to authentication techniques for communication and/or data networks, and more particularly to a method and hybrid system, which combines distributed and centralized infrastructures for authentication of communication and/or data networks.

Authentication techniques are well known for verifying the identities of participants in secured communications and other data transfers. The need for improved authentication has grown with the proliferation of data processing systems. These systems typically have authentication techniques with either a distributed infrastructure or a centralized infrastructure, but not both or a hybrid thereof. The distributed infrastructures and the centralized infrastructures have been extensively and separately developed by persons skilled in the art. However, no single authentication system has been developed utilizing both a distributed infrastructure and a centralized infrastructure. Also, no method has been developed for migrating a network from a distributed infrastructure to a centralized infrastructure.

Therefore, a need exists for a hybrid authentication system that combines a distributed infrastructure and centralized infrastructure for optimizing the advantages provided by each architecture.

SUMMARY OF INVENTION

One embodiment of the present invention is a hybrid authentication system for securing communication. In this embodiment, the system includes a distributed authentication infrastructure with a series of interconnected nodes. These nodes are intended to perform a series of functions, one of these functions being the authentication of other nodes. The system further includes a centralized authentication infrastructure, which is later integrated into the distributed authentication infrastructure after the distributed authentication infrastructure has been established. The centralized authentication infrastructure includes a central server coupled to the nodes for verifying the identification of the nodes and/or granting permission to those nodes.

One advantage of the invention is that a hybrid authentication system with distributed infrastructure is provided that can be established within a short period of time and at a substantially low cost.

Another advantage of the invention is that a hybrid authentication system is provided that can migrate from a distributed infrastructure to a centralized infrastructure, or a hybrid thereof, on an ad hoc basis.

Yet another advantage of the invention is that a hybrid authentication system is provided that can allocate enrollment, authentication, or permission responsibilities, or any combination thereof, between distributed and centralized infrastructures for improving the security of the system.

Still another advantage of the invention is that a hybrid authentication system with distributed infrastructure is provided that is substantially protected from a pervasive breach of security.

Yet another advantage of the invention is that a hybrid authentication system with distributed infrastructure is provided that can be sufficiently familiar with local environments so as to prepare itself against attempts to compromise the system, as well as from attackers which are known in the area.

Still another advantage of the invention is that a hybrid authentication system with centralized infrastructure is provided that can utilize a central server for enrolling and authenticating members in a system thereby promoting uniformity and reliability of the system.

Yet another advantage of the invention is that a hybrid authentication system is provided that can be readily migrated to a fully centralized infrastructure so as to further decrease the number of vulnerable points in the system and define a clear line of defense against compromise attempts.

The features, functions, and advantages can be achieved independently and in various embodiments of the present invention or may be combined in yet other embodiments.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

In the following figures the same reference numerals will be used to illustrate the same components in the various views. The embodiments described herein employ features where the context permits, e.g. when a specific result or advantage of the claimed invention is desired. However, a variety of other embodiments are contemplated having different combinations of the described features, having other features than those described herein, or even lacking one or more of the described features. For this reason, it will be appreciated that the invention can be carried out in various other modes and utilized for other suitable applications as desired.

Figure 1:
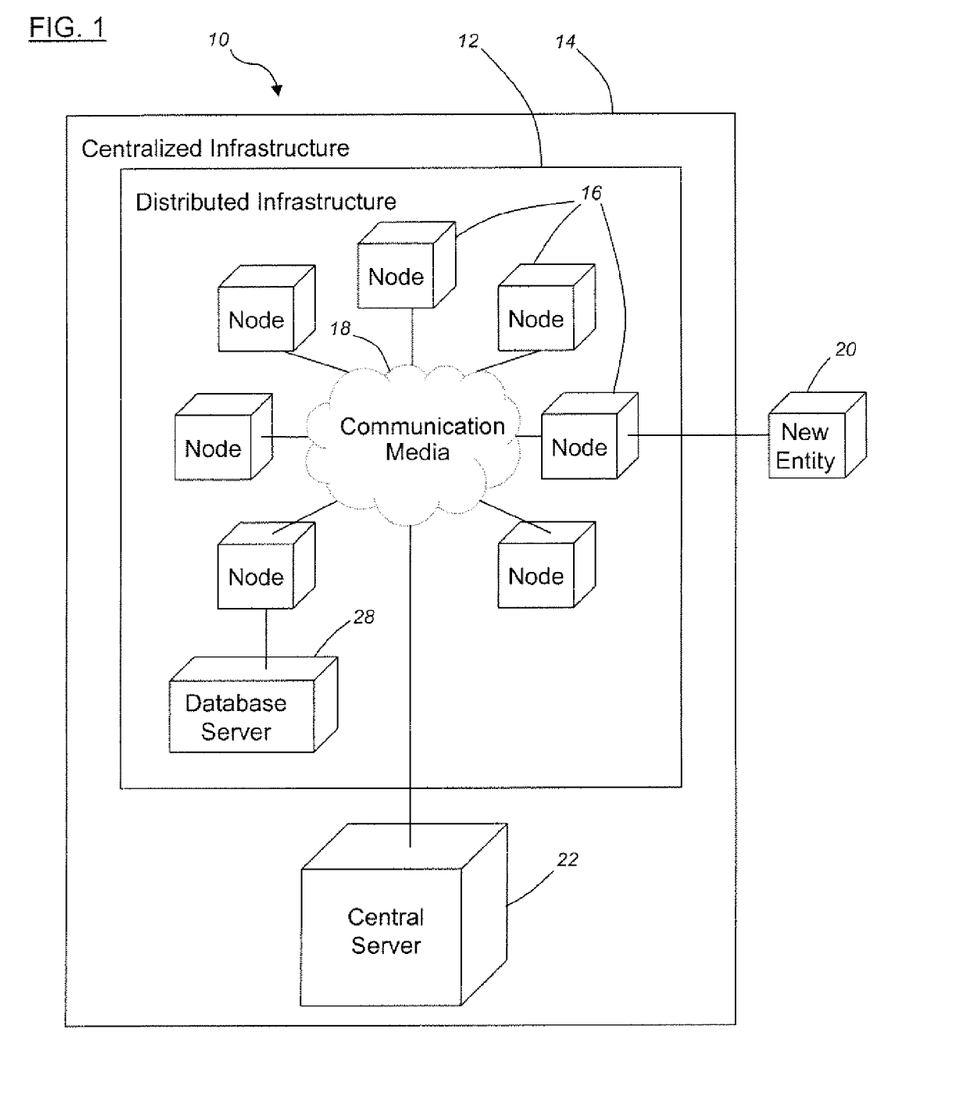
FIG. 1 is a schematic diagram generally illustrating a hybrid authentication system for securing data transfer, communications, and other transactions, according to one advantageous embodiment of the claimed invention.

Referring to FIG. 1, there generally is illustrated a hybrid authentication system 10 ("system") having elements of both a distributed infrastructure 12 and a centralized infrastructure 14, in accordance with one advantageous embodiment of the claimed invention. This system 10 is intended to secure an underlying communication and/or data transfer network.

The distributed infrastructure 12 includes a series of nodes 16 in communication with each other via a communications media 18. The communications media 18 is a communications network, such as the Internet. In other embodiments, the communications media can be any communication system including by way of example, local area networks, wide area networks, dedicated communication lines, telephone networks, wireless data transmission systems, two-way cable systems, customized computer networks, interactive kiosk networks, automatic teller machine networks, interactive television networks, and the like. However, those skilled in the art will recognize that various other suitable communication media can be utilized as desired.

Each node 16 can be utilized for enrolling a new entity 20 into the system 10, authenticating other nodes 16 previously enrolled in the system 10, granting permission to those nodes 16, or any combination thereof (as detailed in the descriptions for FIGS. 5-10).

A person of ordinary skill in the art will understand that the distributed infrastructure 12 is advantageous because it can be established within a substantially short period of time and at significantly low costs. Moreover, a large number of nodes 16 in the system 10 can substantially decrease the risk of a pervasive breach in the system's security since, as is known in the art, each node 16 in a distributed infrastructure 12 can function as an independent enrolling, authenticating, and permission-granting mechanism. In that way, a substantial number of the individual nodes 16, if not all of them, must be compromised in order to cause a widespread breach of the entire system's security. Also, the distributed infrastructure 12 further improves the security of the system 10 because the nodes 16 can be sufficiently familiar with their respective local environments, eg. Common modes of criminal conduct level attributed to the local inhabitants. In that regard, those nodes 16 can be readily prepared to defend against attempts to compromise the system's security and against attackers known in the area.

The system 10 further includes the centralized infrastructure 14 integrated into the distributed infrastructure 12. Specifically, the centralized infrastructure 14 requires that a central server 22 is coupled to the nodes 16 of the distributed infrastructure 12 via the communication media 18. In this way, the tasks associated with the enrollment, the authentication, and the permission of nodes can be allocated between the nodes 16 and the central server 22 (as detailed in FIGS. 5-10).

The central server 22 can be one or more servers utilized exclusively for enrolling new entities, authenticating previously enrolled nodes 16, granting permission to the nodes 16, or any combination thereof. In this way, it is understood that the server's responsibilities are limited and readily defined. For that reason, a substantially definite line of defense may be drawn for protecting the central server 22.

Another benefit of the centralized infrastructure 14 is that the nodes 16 can receive support from the central server 22 in enrollment tasks, authentication tasks, permission tasks, or any combination thereof.

For example, a verifying node 24 (shown in FIG. 9) may attempt to verify the identity of a new entity 20 in view of one or more predetermined credentials provided by the new entity 20. The verifying node 24 may not have a sufficiently large database for storing sufficient data that could verify the new entity's credentials and thus its identity. For that reason, the verifying node 24 can refer to the central server 22 for accessing its substantially large database and verifying the new entity's identity. This feature is detailed in the descriptions for FIGS. 6A-6D and 10. Additionally, it is understood that the node 16 can instead completely defer all responsibility to the central server 22 for determining whether the new entity 20 should be enrolled. In that embodiment, the central server 22 can produce a log for failed authentication or enrollment attempts made by the nodes.

Yet another benefit of the centralized infrastructure 14 is that the central server 22 can send global directives to the nodes 16. For example, the central server 22 can create an updated certificate revocation list (CAL) whenever the central server 22 is notified of one or more previously unknown compromised nodes. It is understood that a suitable distributing mechanism (not shown) can distribute the CRL to the nodes 16. In this way, the nodes 16 can be aware of one or more compromised nodes and deny those compromised nodes from accessing the underlying communication network. In addition, the central server 22 can utilize a global directive for sending re-key information to all the nodes 16 in situations when security requires such action, e.g. an unauthorized entity has obtained access to the private keys. It will also be appreciated that each node 16 can cache a CRL with an associated timeout or expiry, and therefore independently request the central server 22 or its distributing mechanism for the latest CRL when the timeout period has lapsed. In view of these examples, it can be seen that the central server 22 can be utilized for enabling widespread changes or making other adaptations to the system's security within a substantially short period of time.

Figure 2:
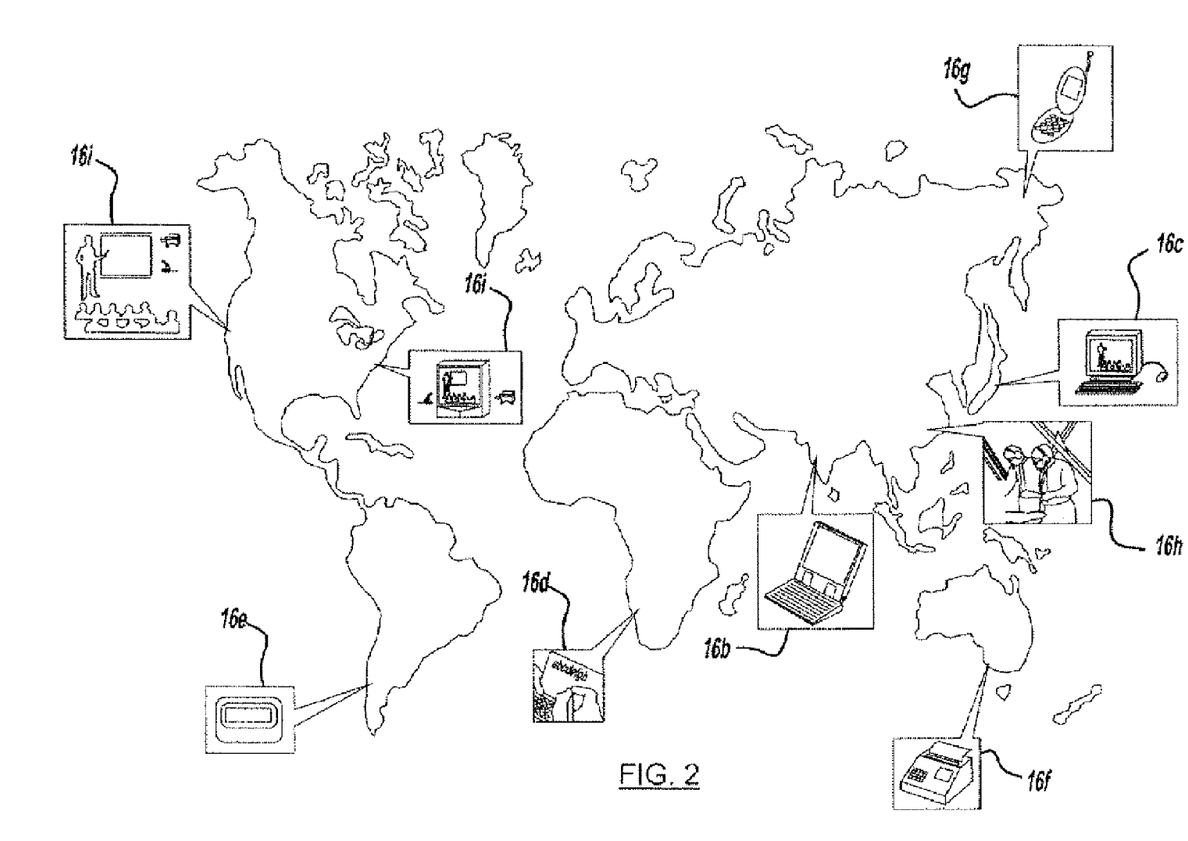
FIG. 2 is a schematic diagram illustrating the hybrid authentication system in FIG. 1 for enabling a secured global enterprise for an aerospace manufacturing and communications company, according to one exemplary embodiment of the claimed invention.

Referring now to FIG. 2, there is shown a schematic diagram of the system 10 illustrated in FIG. 1, for securing digital communications within a global e-business enterprise, in accordance with one advantageous embodiment of the claimed invention.

This system 10 has a distributed infrastructure 12 with interconnected nodes 16. Examples of these nodes 16 include video conferencing equipment 16a, portable notebook computers 16b, desktop computers 16c, pocket personal computers 16d, digital pagers 16e, digital fax machines 16f, wireless phones 16g, on-site headsets 16h in manufacturing plants, combined camera-and-monitor sets 16i, personal digital assistants (not shown), other suitable communication devices, or any desired combination thereof. These nodes 16 are connected to one or more other nodes 16 by way of the communication media 18. It is understood that each node may not be directly or indirectly connected to every other node in the system 10.

As introduced above, each node 16 can be utilized for enrolling a new entity 20 into the system 10, authenticating other nodes 16 that were previously enrolled in the system 10, granting permission to those nodes 16, or any combination thereof (as detailed in the descriptions for FIGS. 5-10). In this way, each node 16 can be utilized for determining that new entities 20 or other nodes 16 are authorized to access communications or other kinds of data within the system 10. One or more of these nodes 16 may have access to and provide a gateway to a database server 28 (shown in FIG. 1). This database server 28 can have engineering schematics, proprietary information, confidential correspondences, and various other valuable information stored therein. It will be appreciated this system 10 can be utilized to secure the transfer of stored data, real-time data, various other data, or any combination thereof.

According to this embodiment, the system 10 further includes a centralized infrastructure 14 with one or more central servers 22 in connection with the nodes 16. This central server 22 can be utilized for supporting or even replacing a node 16 with regard to enrolling, authenticating, or granting permission to new entities or other nodes 16. In other words, in one advantageous embodiment, the central servers 22 support the nodes 16 and provide a second measure of security for verifying the identification and the privileges of the nodes 16 (as detailed in the descriptions for FIGS. 5, 6A-6D, and 9). In another advantageous embodiment, the central servers 22 can be permanent or temporary proxies for the nodes 16 with respect to enrollment functions.

By way of one example, as shown in FIG. 2, one advantageous application of this system 10 is to secure confidential communications and data transferred during a video teleconference. In particular, a meeting can take place in Seattle, Wash., and be transmitted via the communication media 18 to various authorized nodes 16a-16j across the country and/or around the world. One or more of these nodes 16a-16j can be owned by a third party manufacturer and attached to that vendor's database server. A speaker at the meeting can access engineering schematics or various other desired information from the database server by way of the respective node 16 in connection therewith. Also, newly-enacted corporate directives, which are established during the meeting, can be immediately transmitted to the nodes 16a-16j worldwide. With this hybrid authentication system 10, the corporation can collaborate various geographically distributed teams with different hierarchical management levels at a desired time for enabling the efficient operation of a global enterprise.

Another exemplary application of the system can generally be for securing data transfer in an online exchange system for trading aerospace and defense related technology.

Still in another embodiment, the system can generally be utilized by an aircraft manufacturer for securing a web portal, which is operated by the manufacturer for providing the manufacturer's customers with access to information related to the operation of an aircraft sold to those customers. This web portal can provide customers with maintenance documents, engineering drawings, flight operation documents, documents related to ordering spare parts online, the capability to track and prioritize the resolution of in-service issues, notices of new service bulletins according to airplane model, products standards, fleet reliability statistics, and various other kinds of programs, data, and information.

In yet another embodiment, the system can be utilized for securing communications of an air traffic control system which manages a wide area of coverage including a large body of water. The distributed infrastructure of the system can be embodied within a series of interconnected nodes, some of which are integrated within respective buoys and positioned at predetermined sites in the ocean or other body of water. Furthermore, the centralized infrastructure of the system can be comprised of one or more land-stationed central servers coupled to one or more of the buoy-mounted nodes.

In addition to the examples described hereinabove, it is contemplated that the system can be utilized for securing communications, data transfer, or other transactions related to various other enterprises or organizations.

Figure 3:
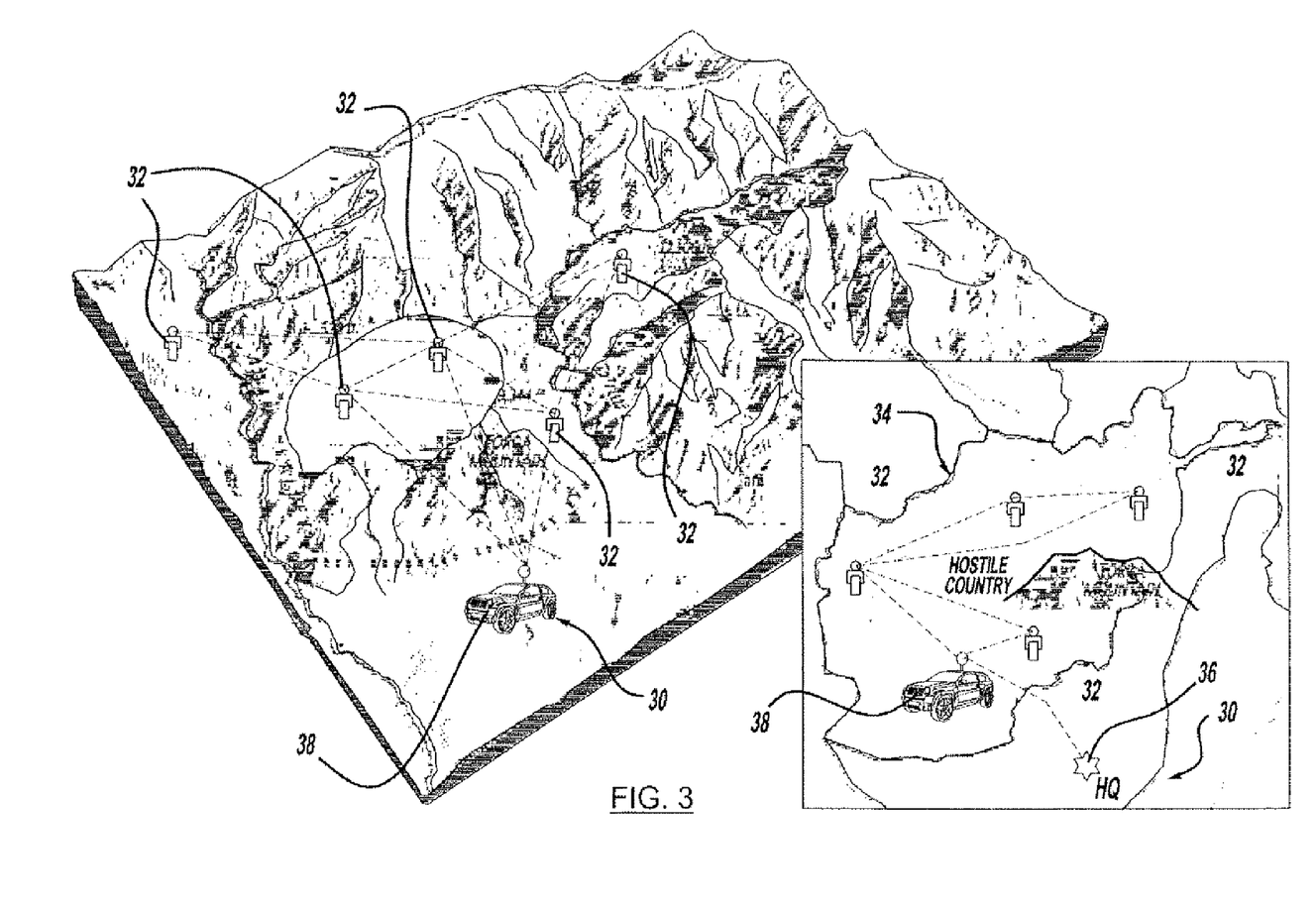
FIG. 3 is a schematic diagram illustrating the hybrid authentication system in FIG. 1 for enabling the operation of a secured military campaign, according to another exemplary embodiment of the claimed invention.

Referring now to FIG. 3, there is shown the system 10 illustrated in FIG. 1, for securing communications and data transfer in a military operation involving one or more military forces 30, in accordance with another advantageous embodiment of the claimed invention. This system 10 enables the military force 30 to avoid the vulnerabilities typically associated with information warfare yet still benefit from the significant opportunities in connection therewith. The underlying communications system can include various communication devices and computers functioning together to form what is known in the military as command, control, communications and information systems ("C3I network"). As is known, the C3I network can be utilized for providing effective communication links to friendly forces, destroying enemy communications, and protecting friendly communications from interference.

As specifically shown in FIG. 3, the system 10 can be utilized for securing a C3I network in a situation where one or more allied military forces deploy a series of military units 32 into a hostile territory 34. It is understood that the military units 32 can be squads, platoons, companies, battalions, brigades, other units, or any combination thereof. Each military unit 32 includes one or more radio operators, who utilize a communication device or node (as introduced in the description for FIG. 1) for communicating with the other military units 32. Examples of these nodes include software-defined radio devices, VHF radio sets, HF radio sets, UHF radio sets, various other suitable communication devices, or any combination thereof. According to the claimed invention, the distributed infrastructure 12 of the system allows each node to independently or collaboratively perform tasks associated with the enrollment, the authentication, and the granting of permission to other nodes (as explained in the description for FIGS. 5-10). In this way, the military units 32 can utilize the C3I network with a substantially a low risk that the network has been compromised.

Furthermore, the centralized infrastructure 14 of the system 10 can be utilized to supplement or replace the distributed infrastructure 12 with respect to enrollment, authentication, and permission-granting functions. For example, a verifying node or a quorum of selected nodes can accomplish one of the above functions and then recieve support from a central server located at a remotely stationed main headquarters 36 (as explained in the descriptions for FIGS. 5-10).

As shown in FIG. 3, the military units 32 may be located beyond the range of communication with the main headquarters 36. This may result from excessive geographical distance, a mountain range obstruction, an urban or cityscape obstruction, or a variety of other barriers therebetween. For that reason, an intermediate unit 38 may be positioned between the military units 32 and the main headquarters 36 for relaying a communication signal to the main headquarters 36. This intermediate unit 38 can include a transceiver with sufficiently a high-powered battery for reaching the main headquarters 36 and a central server located therein. In this way, the system 10 can allow real-time transmission of up-to-date data, e.g. enemy positions, to many different military units 32 rapidly. The live databases can be customized for air defense, logistics, personnel matters, intelligence, and other suitable data. As is known, the C3I network can include communication media including cable, satellite, radio, and a variety of other suitable communication means as desired.

Figure 4:
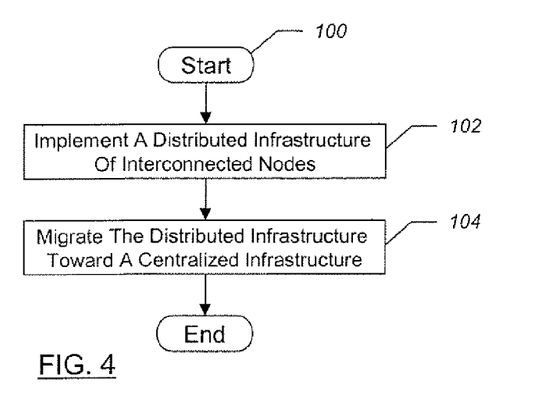
FIG. 4 is a logic flow diagram generally illustrating a method for implementing the hybrid authentication system shown in FIG. 1.

Referring now to FIG. 4, a logic flow diagram illustrates a method for establishing the system 10 shown in FIG. 1, according to one advantageous embodiment of the claimed invention. The method commences in step 100 and then immediately proceeds to step 102.

In step 102, the distributed infrastructure 12 of the system 10 is implemented. The benefit of this feature is that the distributed infrastructure 12 can be established rapidly and with substantially low costs. This step can be accomplished by interconnecting the series of nodes 16 together via the communication media 18 described hereinabove. However, it will be appreciated that the distributed infrastructure 12 can be accomplished by way of various other suitable methods as desired. Then, the sequence proceeds to step 104.

In step 104, the centralized infrastructure 14 of the system 10 is integrated within the distributed infrastructure 12. Specifically, one or more of the authorized nodes 16, which have been previously enrolled into the system 10, can be utilized for enrolling one or more central servers 22 into the system 10. In this respect, the central server 22 can be treated as if it were a new-entity node 16. However, unlike the nodes 16 detailed above, the central server 22 is utilized only for enrolling, authenticating, and granting permission to the nodes 16 whereas the nodes 16 are capable of performing other functions in addition to those accomplished by the central server 22.

In another embodiment, the central server 22 can also be utilized for issuing global directives. For example, the central server 22 can publish updated CRLs whenever another revoked certificate is added to the CRL. In addition, the central server 22 can send various kinds of other data to trusted nodes for replacing one or more compromised channels of communication with one or more secured modes of communication. By way of example, the central server 22 can send rekey or critical chain of trust information to the trusted nodes.

It will be appreciated that step 104 can be accomplished on an ad hoc basis. In this regard, the system 10 can utilize the distributed infrastructure 12 for a given period of time and then migrate the system 10 toward a centralized infrastructure 14 when sufficient finances are available or when it is otherwise desired. For that reason, the system 10 provides a robust, flexible means of securing a communication network. It is also understood that the migration to the centralized infrastructure can be partial or complete.

Figure 5:
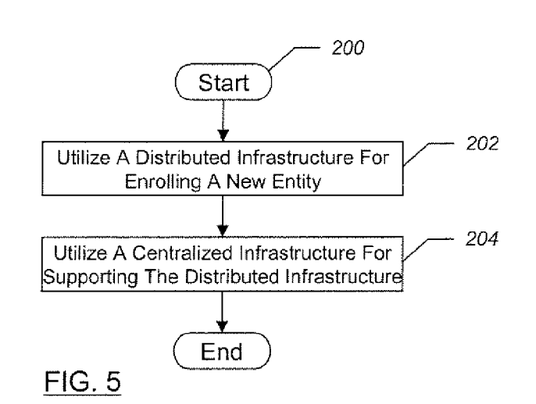
FIG. 5 is another logic flow diagram of the method, introduced in FIG. 4, for enrolling a new entity into the system, according to one advantageous embodiment of the claimed invention.

Referring now to FIG. 5, there generally is shown a logic flow diagram of a method for utilizing the system 10 shown in FIG. 1 for enrolling a new entity 20 into the system 10, in accordance with one advantageous embodiment of the invention. This general method is exemplified in greater detail in FIGS. 6A-6D. The method begins in step 200 and then immediately proceeds to step 202.

In step 202, the distributed infrastructure 12 of the system 10 is utilized for determining whether a new entity 20 is privileged to be enrolled into the system 10 and therefore whether that new entity 20 can have access to data transferred or stored in the underlying system. Two underlying systems are exemplified as the applications shown in FIGS. 2 and 3, but various other embodiments are contemplated. This step is accomplished by requiring the new entity 20 to present a certificate or one or more predetermined credentials to one or more nodes 16 of the distributed infrastructure 12. These credentials can vary as desired and can depend on the underlying system protected by the hybrid authentication system 10. For example, in a global e-business environment, acceptable credentials can include an employee's ID badge, a driver's license, or a passport. Then, the sequence proceeds to step 204.

In step 204, the centralized infrastructure 14 of the system 10 generally is utilized as a back-up or supplementary security measure for determining whether the new entity 20 is authorized for enrollment into the system 10. This step can be accomplished by one or more central servers 22 in the centralized infrastructure 14.

Figure 6A:
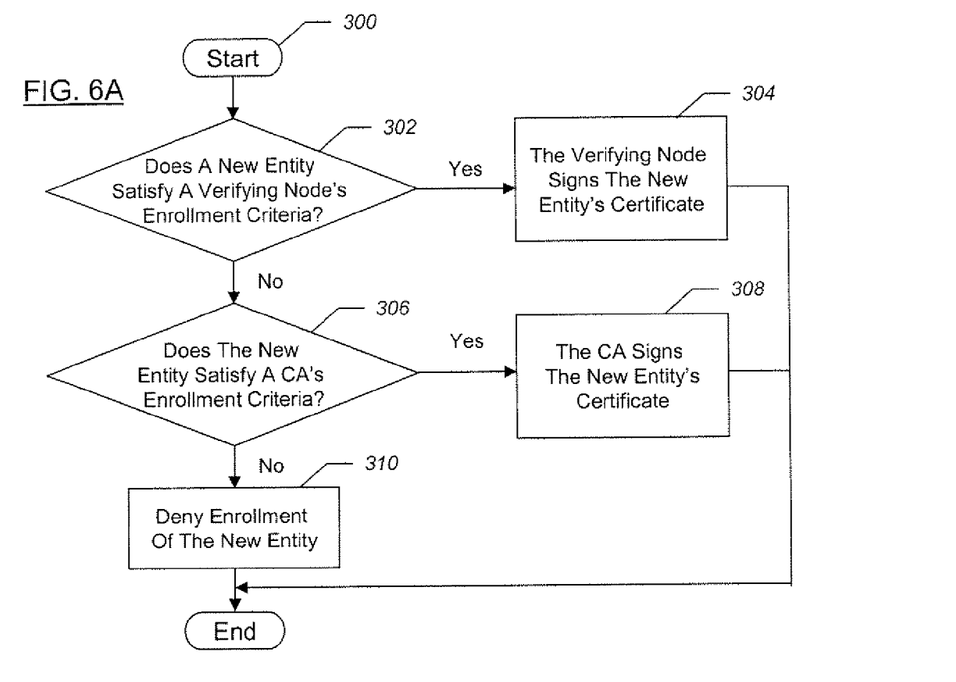
FIG. 6A is a logic flow diagram illustrating a hybrid method utilizing both a distributed web-of-trust infrastructure and a centralized public key infrastructure for performing the method shown in FIG. 5, according to one advantageous embodiment of the claimed invention.
Figure 9:
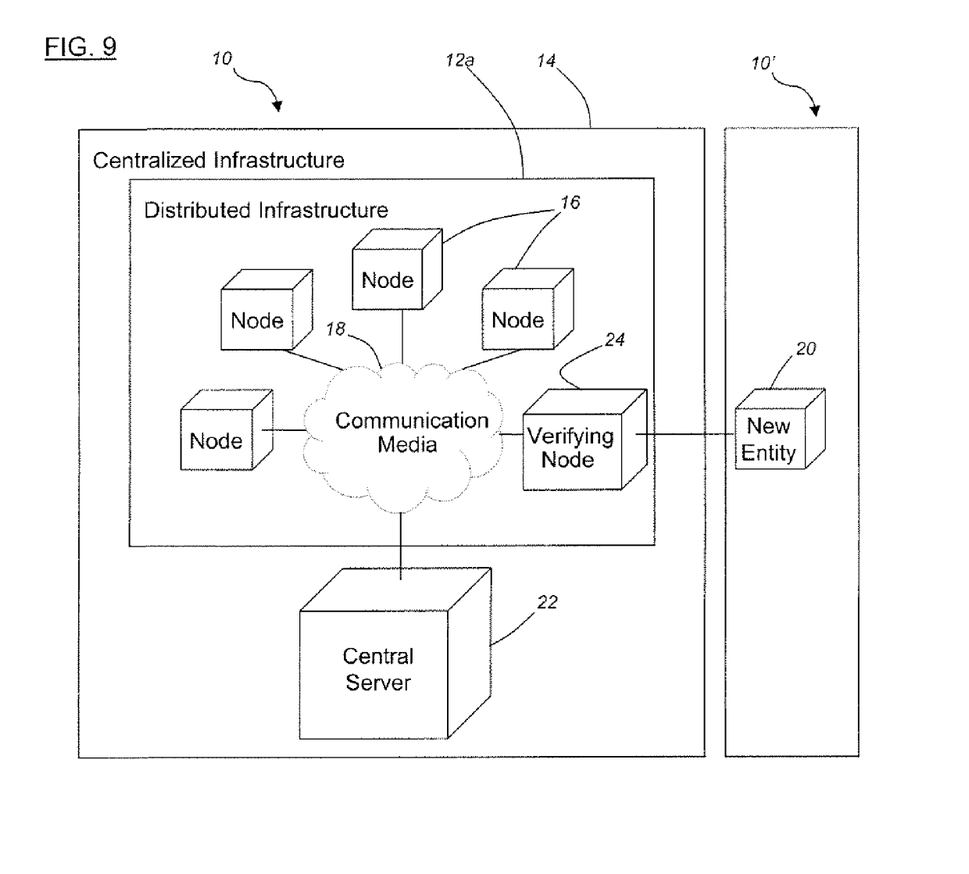
FIG. 9 is a schematic diagram illustrating the relationship between a verifying node, a central server, and the new entity, for accomplishing the subroutines shown in FIGS. 6A, 6B, and 8.

Referring now to FIGS. 6A and 9, there is shown one detailed example of the general method illustrated in FIG. 5, according to one advantageous embodiment of the claimed invention. In this embodiment, a distributed web-of-trust infrastructure 12a can be utilized in connection with a centralized public key infrastructure 14 for enrolling the new entity 20 into the system 10. It is also understood that the distributed web-of-trust infrastructure 12a can utilize a public/private key pair for securing access to underlying networks. The method commences in step 300 and then immediately proceeds to step 302.

In step 302, a verifying node 24, which had been previously enrolled into the system 10, evaluates the new entity 20 and determines whether the new entity 20 is privileged to be enrolled into the system 10. This step can be accomplished by requiring the new entity 20 to present the verifying node 24 with a certificate or one or more predetermined credentials. If those credentials match corresponding credentials stored within the verifying node's database or the credentials pass other suitable enrollment criteria, then the sequence proceeds to step 304.

In step 304, the verifying node 24 utilizes its private key to sign the new entity's certificate indicating that the verifying node 24 trusts the new entity 20. One of ordinary skill in the art will understand that this signed certificate can then be utilized to authenticate the new entity 20 to other nodes 16 that directly or indirectly trust the verifying node's signature.

Also, the certificate, which is signed by the verifying node 24, can provide a predetermined level of privilege or permission to the new entity 20. In one embodiment, the verifying node 24 can only provide the new entity 20 with a level of permission up to the level of permission associated with the node 24. For example, in global e-business applications, a high-ranking president or other officer of a corporation can be associated with a certificate that permits the president to enroll a vendor or another new entity with a wide variety of permission levels. On the other hand, a lower-ranking employee can be associated with a certificate that only allows him to enroll a new entity and provide that new entity with relatively low permission levels up to those given to the lower-ranking employee.

The certificate can allow the new entity to access communications or data in the underlying system as desired. However, it will be appreciated that permission can be granted according to various other protocols in addition to the one described herein.

In another embodiment, the verifying node 24 can also search a certificate revocation list (CRL) for determining whether the new entity's certificate has been revoked. If the verifying node 24 finds that the new entity's certificate is listed on the CRL, then the verifying node 24 denies enrollment to the new entity 20.

If in step 302 the credentials do not match corresponding credentials within the verifying node's database or satisfy other suitable enrollment criteria executed by the verifying node 24, then the sequence proceeds to step 306.

In step 306, the new entity 20 directly or indirectly communicates with the central server 22 for performing a back-up security measure and determining whether the new entity 20 is authorized for enrollment into the system 10. Pursuant to the public key infrastructure, the central server 22 is a certificate authority (CA) with a substantially large database. This database can store significantly more credentials or various other enrollment data than the verifying node 24. In this way, although the verifying node 24 may not have the new entity's credentials and therefore deny enrollment to the new entity 20, the CA may have the new entity's credentials stored within its database and therefore enroll the new entity 20 into the system 10.

Specifically, if in step 306 the new entity's credentials match corresponding credentials stored within the CA's database or the new entity's credentials pass other suitable enrollment criteria executed by the CA, then the sequence proceeds to step 308.

In step 308, the CA utilizes its key to sign the new entity's certificate and enroll the new entity into the system 10.

However, if in step 306 the new entity's credentials do not match corresponding credentials stored within the CA, then the sequence proceeds to step 310.

In step 310, both the verifying node 24 and the CA deny enrollment to the new entity 20.

In another embodiment, the sequence continues from step 310 to accomplish mutual enrollment. Specifically, as shown in FIG. 9, the new entity 20 is a node that was previously enrolled into another system 10" and can thus be utilized for enrolling the verifying node 24 into that system 10". In this regard, the respective systems 10, 10" of the verifying node 24 and the new entity 20 can be combined.

Figure 6B:
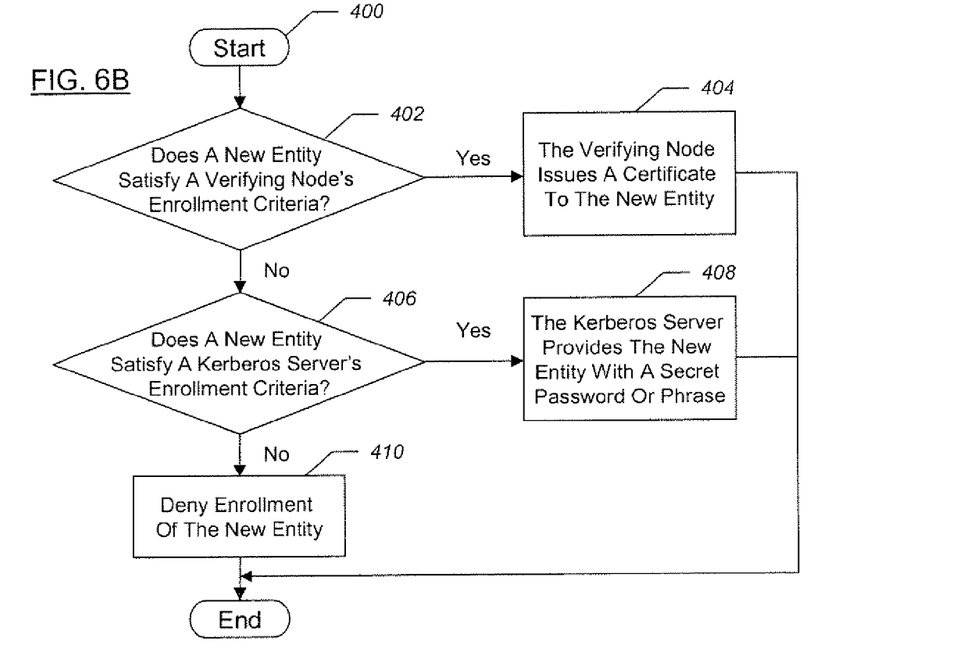
FIG. 6B is another logic flow diagram illustrating a hybrid method utilizing both a distributed web-of-trust infrastructure and a centralized kerberos service model for performing the method shown in FIG. 5, according to another advantageous embodiment of the claimed invention.

Referring now to FIGS. 6B and 9, there is shown another detailed example of the general method illustrated in FIG. 5, according to another advantageous embodiment of the claimed invention. In this example, the distributed web-of-trust infrastructure 12a can be utilized in connection with a centralized kerberos infrastructure 14 for enrolling the new entity 20 into the system 10.

This sequence begins with steps 400-404, which can be performed similar to steps 300-304 in FIG. 6A. If in step 402 the credentials submitted by the new entity 20 do not match corresponding credentials stored in the verifying node 24 or satisfy other suitable enrollment criteria, then the sequence proceeds to step 406.

In step 406, the new entity 20 directly or indirectly communicates with the central server 22 for performing a back-up security measure and determining whether the new entity 20 is privileged for enrollment into the system 10. In accordance with the kerberos infrastructure, the central server 22 is a kerberos key server with a substantially large database. Similar to the PKI database, the database for the kerberos key server stores significantly more credentials or various other enrollment data than the verifying node 24. In this way, the kerberos key server may have the new entity's credentials stored within its database and therefore enroll the new entity 20 into the system 10.

Specifically, if in step 406 the new entity's credentials match corresponding credentials stored within the kerberos key server's database or the credentials pass other suitable enrollment criteria executed by the kerberos key server, then the sequence proceeds to step 408.

In step 408, the kerberos key server creates a secret word or secret phrase intended to be shared between the server and the new entity 20. In that way, the new entity 20 can later utilize the secret password or secret phrase to authenticate itself to the kerberos key server and the nodes 16 trusted by the kerberos key server.

However, if in step 406 the new entity's credentials do not match corresponding credentials stored within the kerberos key server, then the sequence proceeds to step 410.

In step 410, the new entity 20 is denied enrollment into the system 10.

In another embodiment, the sequence continues from step 410 to accomplish mutual enrollment. Specifically, as shown in FIG. 9, the new entity 20 is a node that was previously enrolled into another system 10" and is utilized for enrolling the verifying node 24 into that system 10". In this regard, the respective systems 10, 10" of the verifying node 24 and the new entity 20 can be combined.

Figure 6C:
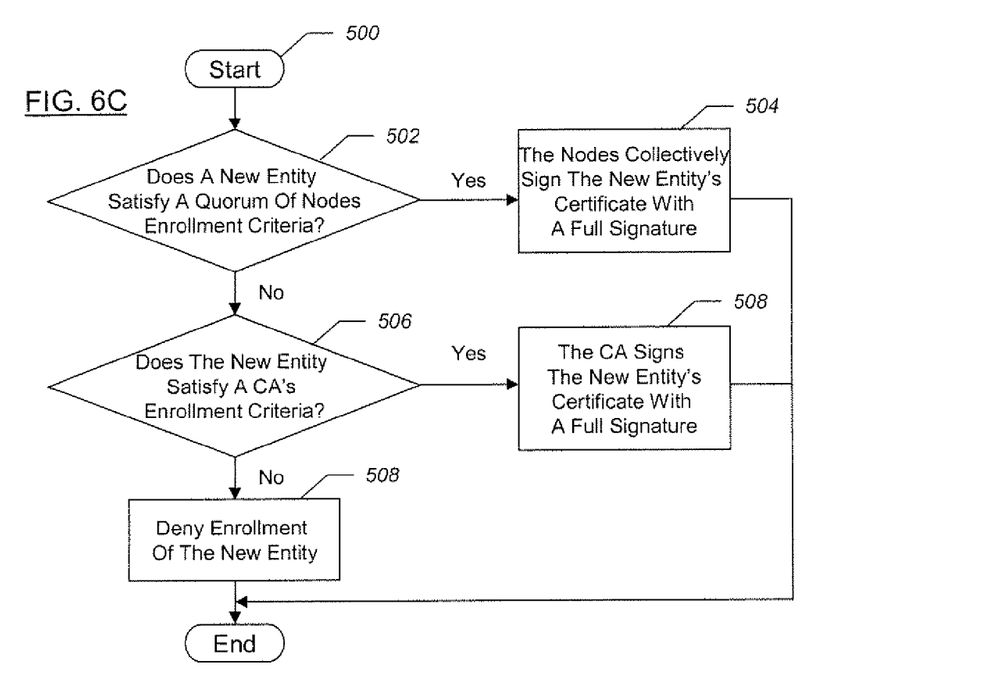
FIG. 6C is yet another logic flow diagram illustrating a hybrid method utilizing both a distributed threshold cryptography infrastructure and a centralized public key infrastructure for performing the method shown in FIG. 5, according to yet another advantageous embodiment of the claimed invention.
Figure 10:
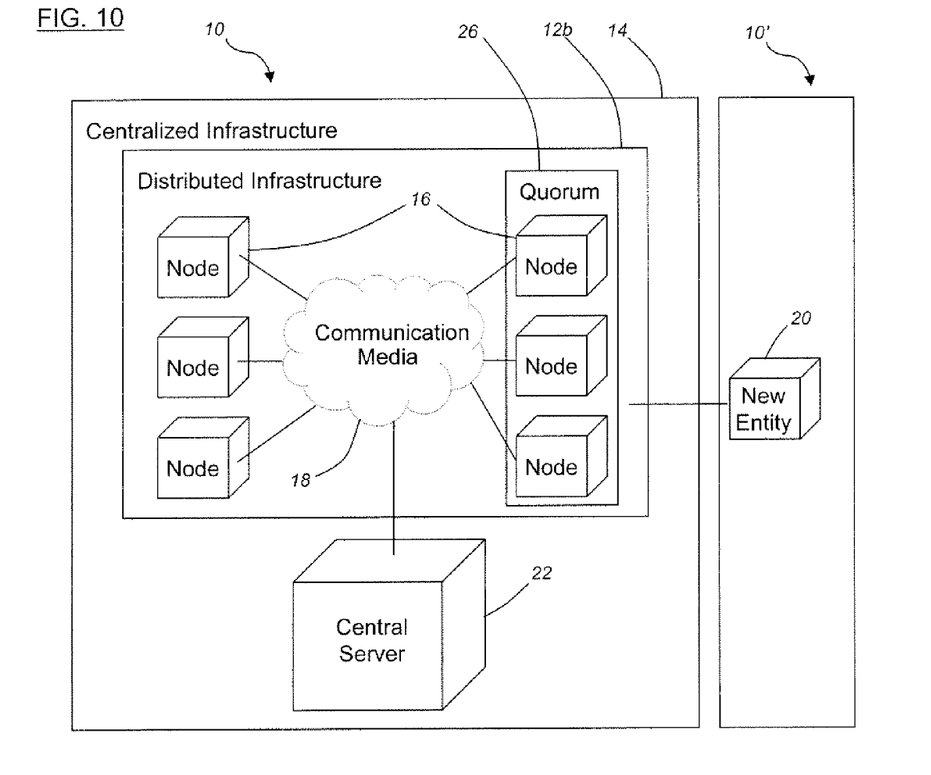
FIG. 10 is a schematic diagram illustrating the relationship between a quorum of selected nodes, a central server, and the new entity, for accomplishing the subroutines shown in FIGS. 6C, 6D, and 8.

Referring now to FIGS. 6C and 10, there is shown yet another detailed example of the method illustrated in FIG. 5, according to another advantageous embodiment of the claimed invention. In this example, the distributed threshold cryptography infrastructure 12b can be utilized in connection with the centralized public key infrastructure 14 for enrolling the new entity 20 into the system 10. This method begins in step 500 and then immediately proceeds to step 502.

In step 502, a quorum 26 of the nodes 16 evaluates the new entity 20 and determines whether the new entity 20 is privileged to be enrolled into the system 10. For example, the system 10 can include a total of twenty (20) nodes and define a quorum as four (4) or more of these nodes that vote in favor of enrolling the new entity 20. However, it will be appreciated that the system 10 can include more or less than twenty (20) nodes and define a quorum otherwise as desired.

Specifically, this step can be accomplished by requiring the new entity 20 to present a certificate or one or more predetermined credentials to the nodes 16. Each of these nodes 16 compares the new entity's credentials to those stored in the node's database. Then, each node 16 determines whether the new entity 20 is privileged for enrollment and therefore whether the node 16 should cast a vote in favor of enrollment. If the nodes 16 determine that the new entity is privileged for enrollment, then the sequence proceeds to step 504.

In step 504, at least the predetermined quorum 26 of nodes 16 votes to enroll the new entity 20. Specifically, a key is divided into several partial keys, e.g. thirty (30) keys. A minimum number of these partial keys, e.g. four (4) partial keys, can be utilized for creating a full signature. Each node 16 possesses one partial key and therefore can partially sign the new entity's certificate to produce a fraction of the full signature. A quorum of the nodes, e.g. four (4) nodes, can utilize their partial keys to sign the new entity's certificate and provide the new entity 22 with a full signature.

It is understood that the quorum 26 can include any of the nodes 16 in the system 10 as long as the predetermined minimum number of nodes 16 vote in favor of enrollment. Although this full signature will not indicate which nodes trust the new entity, it will enroll the new entity 20 into the system 10. A person of ordinary skill in the art will also understand that this signed certificate can then be utilized to authenticate the new entity 20 to other nodes 16 in the system 10. In this light, this feature creates the web of trust.

The new entity 20 can then be allowed to access communications or data in the underlying system as desired. However, it will be appreciated that permission can be granted according to various other protocols, in addition to this identity verification.

However, if in step 502 less than a quorum 26 of nodes 16 votes in favor of enrollment or the new entity otherwise fails to satisfy enrollment criteria, then the sequence proceeds to step 506.

In step 506, the new entity 20 directly or indirectly communicates with the central server 22 for performing a back-up security measure and determining whether the new entity 20 is privileged for enrollment into the system 10. Similar to FIG. 6A and pursuant to the public key infrastructure, the central server 22 is a Certificate Authority (CA) with a substantially large database. This database stores significantly more credentials or various other enrollment data than the nodes 16. In this way, although an insufficient number of nodes 16 can have archived credentials matching the new identity's credentials, the CA may have the new entity's credentials stored within its database and therefore enroll the new entity 20 into the system 10.

Specifically, if in step 506 the new entity's credentials match corresponding credentials stored within the CA's database or the credentials pass other suitable enrollment criteria, then the sequence proceeds to step 508.

In step 508, the CA signs the new entity's certificate with the CA's keys. As described in step 504, each node 16 possesses one partial key. Moreover, the CA possesses one or more partial keys. In this regard, the CA can by itself possess enough partial keys to sign the new entity's certificate and provide the new entity with a full signature for enrolling the new entity 20 into the system 10. The new entity 20 can then later utilize the signed certificate to authenticate itself to the nodes 16.

However, if in step 506 the new entity's credentials do not match corresponding credentials stored within the CA, then the sequence proceeds to step 510.

In step 510, the new entity 20 is denied enrollment into the system 10.

In another embodiment, the sequence continues from step 508 to accomplish mutual enrollment. As shown in FIG. 10, the new entity 20 is a node that was previously enrolled into another system 10" and is utilized for enrolling the quorum 26 into that system 10". In this regard, the respective systems 10, 10" of the quorum 26 and the new entity 20 can be combined.

In other embodiments, it will be appreciated that the distribution of partial keys between the nodes 16 and the CA allows the new entity 20 to be enrolled into the system 10 by only the nodes 16, only the CA, or various combinations thereof. In other words, the new entity 20 may obtain a sufficient number of partial signatures from various combinations of trusted entities in the system 10. For example, the new entity 20 may not be able to communicate with enough nodes 16 to satisfy a quorum 26 even if the new entity 20 were to receive partial signatures from each node it contacted. In this respect, the new entity 20 would still not have a full signature. Thus, the CA, which has a sufficient number of partial keys, can sign the new entity's certificate with enough partial keys to provide the new entity with a full signature.

Figure 6D:
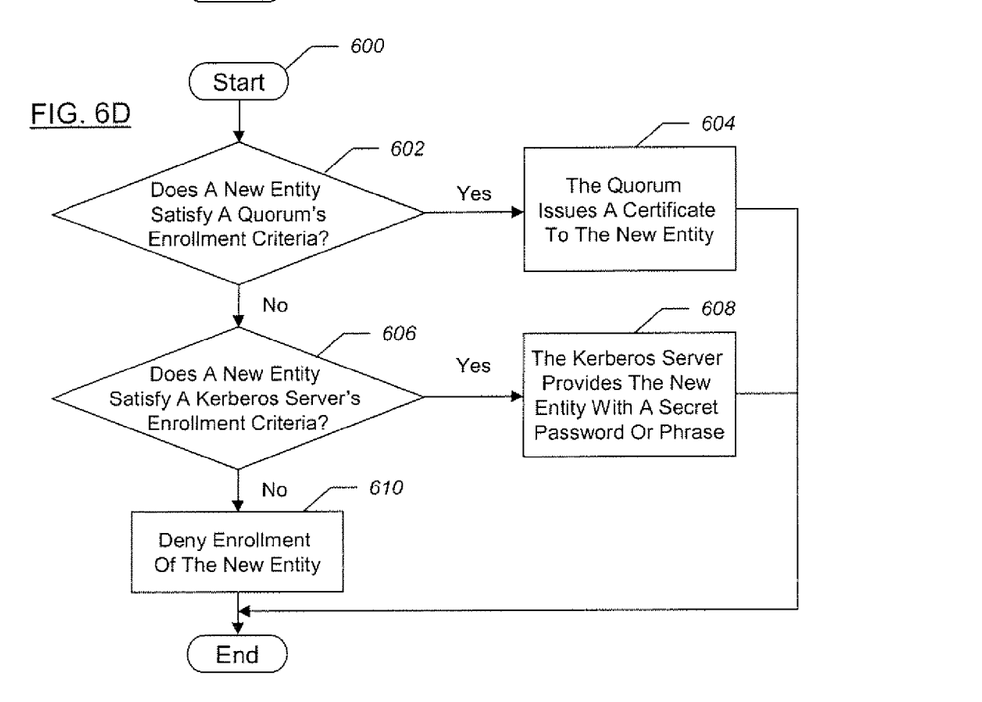
FIG. 6D is still another logic flow diagram illustrating a hybrid method having utilizing both a distributed threshold cryptography infrastructure and a centralized kerberos service model for performing the method shown in FIG. 5, according to still another advantageous embodiment of the claimed invention.

Referring now to FIG. 6D, there is shown still another detailed example of the method illustrated in FIG. 5, according to yet another advantageous embodiment of the claimed invention. In this example, the distributed threshold cryptography infrastructure 12b can be utilized in connection with the centralized kerberos infrastructure 14 for enrolling the new entity 20 into the system 10.

This sequence begins with steps 600-604, which can be performed similar to steps 500-504 in FIG. 6C. If in step 602 the credentials do not match corresponding credentials within the quorum 26 or satisfy other suitable enrollment criteria, then the sequence proceeds to step 606.

Steps 606-610 can be accomplished similarly to steps 406-410 shown in FIG. 6B.

In step 606, the new entity 20 directly or indirectly communicates with the central server 22 for performing a back-up security measure and determining whether the new entity 20 is privileged for enrollment into the system 10. In accordance with the kerberos infrastructure, the central server 22 is a kerberos key server with a substantially large database. Similar to the PKI database, the database for the kerberos key server stores significantly more credentials or various other enrollment data than the verifying node 24. In this way, the kerberos key server may have the new entity's credentials stored within its database and therefore enroll the new entity 20 into the system 10.

Specifically, if in step 606 the new entity's credentials match corresponding credentials stored within the kerberos key server's database or the credentials pass other suitable enrollment criteria executed by the server, then the sequence proceeds to step 608.

In step 608, the kerberos key server creates a secret word or secret phrase intended to be shared between the server and the new entity 20. In that way, the new entity 20 can later utilize the secret password or secret phrase to authenticate itself to the kerberos key server and the nodes 16 trusted by the kerberos key server.

However, if in step 606 the new entity's credentials do not match corresponding credentials stored within the kerbros key server, then the sequence proceeds to step 610.

In step 610, the new entity 20 is denied enrollment into the system 10.

In another embodiment, the sequence continues from step 610 to accomplish mutual enrollment. In particular, the new entity 20 is a node that was previously enrolled into another system 10" (as shown in FIG. 10) and is utilized for enrolling the verifying node 24 into that system 10". In this regard, the respective systems 10, 10" of the verifying node 24 and the new entity 20 can be combined.

Figure 7:
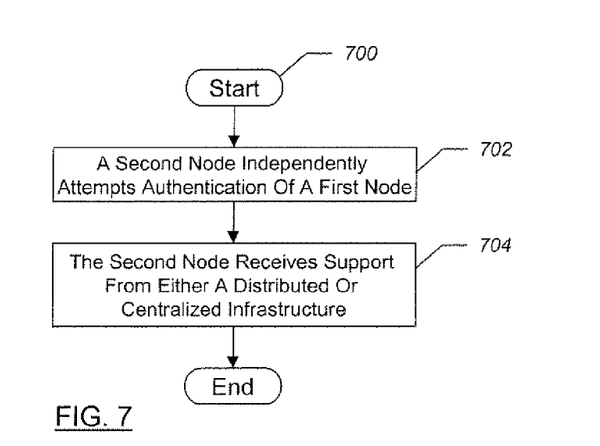
FIG. 7 is another logic flow diagram of the method, introduced in FIG. 4, for authenticating a previously enrolled node, according to another advantageous embodiment of the claimed invention.

Referring now to FIG. 7, there generally is shown a logic flow diagram of a method for utilizing the system 10 (shown in FIG. 1) for authenticating a node 16 which had been previously enrolled in the system, in accordance with one advantageous embodiment of the invention. This general method is exemplified in greater detail in FIG. 8. The method begins in step 700 and then immediately proceeds to step 702.

In step 702, a first node communicates directly with a second node for authenticating itself to the second node. Then, the sequence proceeds to step 704.

In step 704, the second node receives support from either the distributed infrastructure or the centralized infrastructure. However, it is contemplated the second node can independently authenticate the first node without support from the distributed infrastructure or the centralized infrastructure as desired. In this way, step 704 may be omitted.

Figure 8:
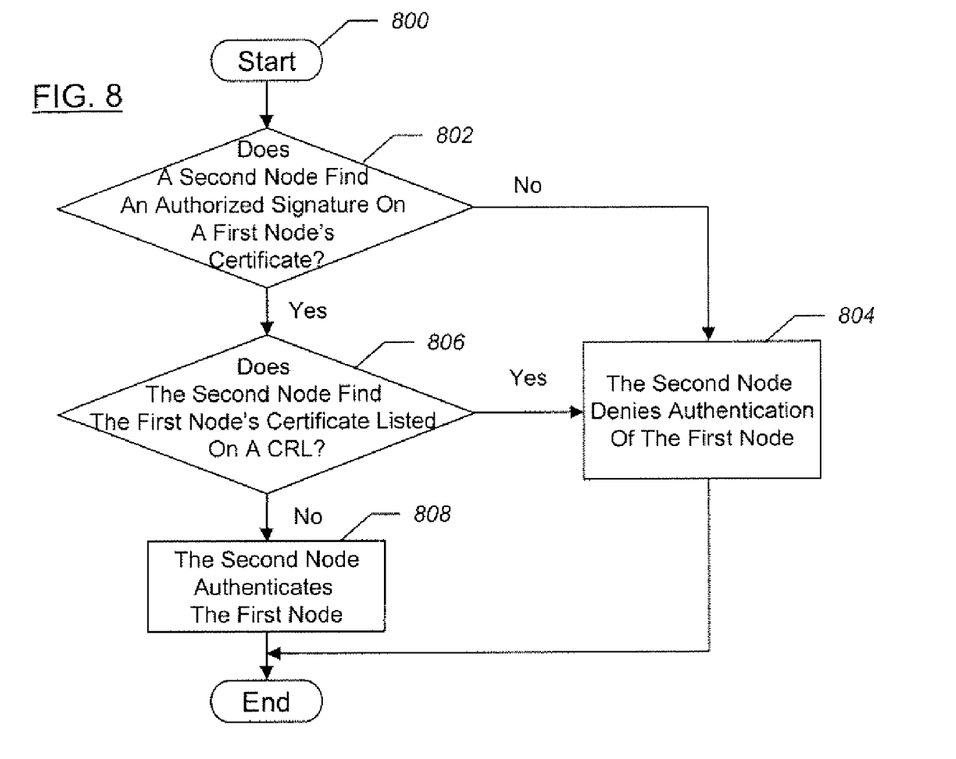
FIG. 8 is a logic flow diagram illustrating a hybrid method utilizing both a distributed web-of-trust infrastructure and a centralized public key infrastructure for performing the authentication method shown in FIG. 7, according to one advantageous embodiment of the claimed invention.

Referring now to FIG. 8, there is illustrated a detailed example of the method shown in FIG. 7, according to one advantageous example of the claimed invention. In this example, the system 10 is comprised of a distributed web-of-trust infrastructure 12a and a centralized public key infrastructure 14. However, it is understood that the distributed infrastructure can instead be a threshold cryptography service model, other suitable distribution infrastructures, or modifications and/or combinations thereof. Also, it will be appreciated that the centralized infrastructure can be a kerberos service model, other suitable centralized infrastructures, or modifications and/or combinations thereof as desired. The method commences in step 800 and then immediately proceeds to step 802.

In step 802, a first node 16 has a first certificate and sends this first certificate to a second node, which had been previously enrolled into the system 10. The second node 16 examines the first certificate for one or more signatures, which authenticate the identity of the new entity 20. If the second node 16 does not find any of these signatures, then the sequence proceeds to step 804.

In step 804, the second node determines that the first node cannot be trusted as having the identity purported by the first node. Immediately thereafter, the sequence terminates.

However, if in step 802 the second node 16 finds one or more authorized signatures, then the sequence proceeds to step 806.

In step 806, the second node requests a certificate revocation list (CRL) from the central server 22, e.g. a Certificate Authority (CA), or a distribution mechanism of the centralized infrastructure 14. The second node searches the CRL for the first certificate to determine whether the first certificate has been revoked. Is understood that the first node's certificate may be revoked when the CA is notified that the first node has been compromised. However, it will be appreciated that the first node's certificate can instead be revoked because an expiry or timeout associated with the certificate had matured or various other revoking events occurred. In addition, it is understood that the second node can perform other suitable functions for verifying the identity of the first node and supporting the distributed infrastructure.

If the second node finds the first certificate is included on the CRL, then the sequence proceeds to step 804 described above. Specifically, the second refuses to sign the first node's certificate thereby denying authentication of the first node.

However, if in step 806 the second node finds the first certificate is not included on the CRL, then the sequence proceeds to step 808. In step 808, the second node determines that the identity and the first certificate, which are associated with the first node, are trustworthy. For that reason, the second node utilizes its key to sign the first nodes certificate. Thereafter, the first node can utilize its signed certificate to indicate to the remaining nodes and the CA that the first node is trustworthy. However, it is also contemplated that the CA can also send a global directive to all the nodes 16 indicating that the first node is trustworthy. It is understood that this additional notification can be omitted as desired.

In yet another embodiment, the sequence can continue from step 808 and allow for mutual authentication. In this regard, the first node generally can authenticate the second node in the same manner that the second node authenticated the first node. For example, steps 802-808 can be repeated in a similar manner so as to authenticate the second node.

While particular embodiments of the invention have been shown and described, numerous variations and alternate embodiments will occur to those skilled in the art. Accordingly, it is intended that the invention be limited only in terms of the appended claims.

The invention claimed is:

1. A hybrid authentication system for securing digital communications in a network and enabling a global enterprise, comprising:
    a distributed authentication infrastructure including a plurality of nodes in communication with each other, each of said plurality of nodes having an identification and intended to perform a series of functions, one of said series of functions for verifying said identification of said plurality of nodes; and
    a centralized authentication infrastructure integrated into said distributed authentication infrastructure and including a central server, said central server being coupled to said plurality of nodes and being utilized for verifying said identification of said plurality of nodes, wherein said central server can be utilized for supporting or replacing at least one of said plurality of nodes;
    wherein said distributed authentication infrastructure is initially implemented and said centralized authentication infrastructure is later integrated into said distributed authenticated infrastructure;
    wherein said distributed authentication infrastructure is selected from the group consisting of a threshold cryptography service model and a web-of-trust service model;
    wherein said centralized authentication system is selected from the group consisting of a public key infrastructure and a kerberos service model;
    wherein said plurality of nodes include at least one of a personal digital assistant, a digital pager, a digital fax machine, a video teleconferencing device, a wireless telephone, a portable computer, a desktop computer, and a communication device, wherein said plurality of nodes includes a verifying node coupled to a new entity for verifying the identification of said new entity and enrolling said new entity into the hybrid authentication system and wherein said verifying node signs a certificate related to said new entity and said central server publishes a certificate revocation list, said verifying node examining said certificate revocation list for determining whether said certificate has been revoked.

2. The hybrid authentication system of claim 1 wherein said new entity provides said verifying node with at least one predetermined credential.

3. The hybrid authentication system of claim 1 wherein a quorum of said plurality of nodes publishes a certificate revocation list, said verifying node examining said certificate revocation list for determining whether said certificate has been revoked.

4. The hybrid authentication system of claim 1 wherein said central server is said new entity.

5. The hybrid authentication system of claim 1 wherein said distributed authentication infrastructure requires a quorum of said plurality of nodes for enrolling a new entity into the hybrid authentication system.

6. The hybrid authentication system of claim 5 wherein each node of said quorum utilizes a partial key for partially signing a certificate related to said new entity so as to provide said new entity with a full signature.

7. The hybrid authentication system of claim 6 wherein said central server publishes a certificate revocation list, each node of said quorum examining said certificate revocation list for determining whether said certificate has been revoked.

8. The hybrid authentication system of claim 6 wherein said central server is said new entity.

9. The hybrid authentication system of claim 1 wherein said central server is coupled to a new entity and is utilized for verifying the identification of said new entity and enrolling said new entity into the hybrid authentication system, said central server producing a log for recording a plurality of failed authentications and a plurality of failed enrollments by said plurality of nodes.

10. The hybrid authentication system of claim 1 wherein said central server is coupled to said plurality of nodes for at least one of issuing a global directive thereto and bolstering said plurality of nodes by assisting with at least one of an enrollment task, an authentication task, and a permission granting task.

11. The hybrid authentication system of claim 10 wherein said global directive includes at least one of a rekey instruction and a critical trust chain path, said rekey instruction and said critical trust chain path for providing a secured data transfer line.

12. The hybrid authentication system of claim 1 wherein said plurality of nodes includes a first node and a second node coupled to said first node, said first node presenting a first certificate to said second node for authenticating said first node.

13. The hybrid authentication system of claim 12 wherein said second node examines a certificate revocation list prepared by said central server, said second node examining said certificate revocation list for determining whether said first certificate has been revoked.

14. The hybrid authentication system of claim 12 wherein said second node examines a certificate revocation list prepared by a quorum of said plurality of nodes, said second node examining said certificate revocation list for determining whether said first certificate has been revoked.

15. The hybrid authentication system of claim 12 wherein said second node is coupled to a trusted third party node from said plurality of nodes, said second node producing an authentication task signed by said first node and sending said authentication task to said trusted third party node, said trusted third party node verifying said identification of said first node.

16. The hybrid authentication system of claim 12 wherein said second node presents a second certificate to said first node for authenticating said second node.

17. The hybrid authentication system of claim 16 wherein said first node examines a certificate revocation list prepared by said central server, said first node examining said certificate revocation list for determining whether said second certificate has been revoked.

18. The hybrid authentication system of claim 16 wherein said first node examines a certificate revocation list prepared by a quorum of said plurality of nodes, said first node examining said certificate revocation list for determining whether said second certificate has been revoked.

19. The hybrid authentication system of claim 15 wherein said first node is coupled to a trusted third party node from said plurality of nodes, said first node producing an authentication task signed by said second node and sending said authentication task to said trusted third party node, said trusted third party node verifying said identification of said first node.

20. A hybrid authentication system, comprising: a distributed authentication infrastructure based on a threshold cryptography service model and including a plurality of nodes in communication with each other, each of said plurality of nodes having an identification and intended to perform a series of functions, one of said series of functions for verifying said identification of said plurality of nodes; and a centralized authentication infrastructure based on a public key infrastructure and integrated into said distributed authentication infrastructure, said centralized authentication infrastructure including a certificate authority coupled to said plurality of nodes and utilized for verifying said identification of said plurality of nodes; wherein said plurality of nodes includes a verifying node coupled to a new entity for verifying the identification of said new entity and enrolling said new entity into the hybrid authentication system and wherein said verifying node signs a certificate related to said new entity and said central server publishes a certificate revocation list, said verifying node examining said certificate revocation list for determining whether said certificate has been revoked, wherein said distributed authentication infrastructure is initially implemented and said centralized authentication infrastructure is later integrated into said distributed authenticated infrastructure.

21. A hybrid authentication system, comprising: a distributed authentication infrastructure based on a web-of-trust service model and including a plurality of nodes in communication with each other, each of said plurality of nodes having an identification and intended to perform a series of functions, one of said series of functions for verifying said identification of said plurality of nodes; and a centralized authentication infrastructure based on a public key infrastructure and integrated into said distributed authentication infrastructure, said centralized authentication infrastructure including a certificate authority coupled to said plurality of nodes and utilized for verifying said identification of said plurality of nodes; wherein said distributed authentication infrastructure is initially implemented and said centralized authentication infrastructure is later integrated into said distributed authenticated infrastructure, and wherein said plurality of nodes is a plurality of members including a first member and a second member, said certificate authority issuing a first group certificate to said first member that provides said first member with a first permission level, said certificate authority issuing a second group certificate to said second member that provides said second member with a second permission level, wherein said first permission level is greater than said second permission level; wherein said first group certificate enables said first member to enroll a new entity into the system and provide said new entity with a new permission level equivalent up to said first permission level.

22. The hybrid authentication system recited in claim 21 wherein said second group certificate enables said second member to enroll a new entity into the system and provide said new entity with a new permission level equivalent up to said second permission level.

23. A hybrid authentication system, comprising: a distributed authentication infrastructure including a plurality of nodes in communication with each other, each of said plurality of nodes having an identification and intended to perform a series of functions, one of said series of functions for verifying said identification of said plurality of nodes; and a centralized authentication infrastructure integrated into said distributed authentication infrastructure, said centralized authentication infrastructure including a certificate authority coupled to said plurality of nodes and utilized for verifying said identification of said plurality of nodes; wherein said centralized authentication infrastructure provides a signed certificate for verifying said identification and wherein said distributed authentication infrastructure is initially implemented and said centralized authentication infrastructure is later integrated into said distributed authenticated infrastructure; wherein said certificate authority is coupled to said plurality of nodes for at least one of issuing a global directive thereto and supporting said plurality of nodes by assisting with at least one of an enrollment task, an authentication task, and a permission granting task; wherein said global directive includes at least one of a rekey instruction and a critical trust chain path, said rekey instruction and said critical trust chain path for providing a secured data transfer line.

24. A method for creating the hybrid authentication system recited in claim 1, comprising: first coupling a plurality of nodes to each other in a distributed authentication infrastructure; then migrating said distributed authentication infrastructure to a centralized authentication structure; and allocating at least one of an enrollment function and an authentication function between said central server and said plurality of nodes.

25. The method of claim 24 wherein migrating comprises coupling a central server to said plurality of nodes.

26. The method recited in claim 25 further comprising: coupling said central server to a verifying node of said plurality of nodes; sending at least one predetermined credential from said central server to said verifying node; enrolling said central server into the hybrid authentication system.

27. The method recited in claim 25 further comprising: coupling said central server to a verifying node of said plurality of nodes; sending a certificate revocation list from said central server to said verifying node; enrolling said central server into the hybrid authentication system.

28. The method recited in claim 24 further comprising: coupling a new entity to one of said plurality of nodes; sending at least one predetermined credential from said new entity to said verifying node; enrolling said new entity into the hybrid authentication system.

29. The method recited in claim 24 further comprising: coupling a new entity to a verifying node of said plurality of nodes; sending a certificate revocation list from said new entity to said verifying node; enrolling said new entity into the hybrid authentication system.

30. The method recited in claim 24 further comprising: appointing said central server as a proxy for a quorum of said plurality of nodes and for fulfilling an enrollment task; and enrolling said new entity into the hybrid authentication system.

* * * * *